Oct. 9, 1928.
H. J. J. M. DE R. DE BELLESCIZE
1,687,063
ELECTRIC SIGNALING
Filed Dec. 24, 1924
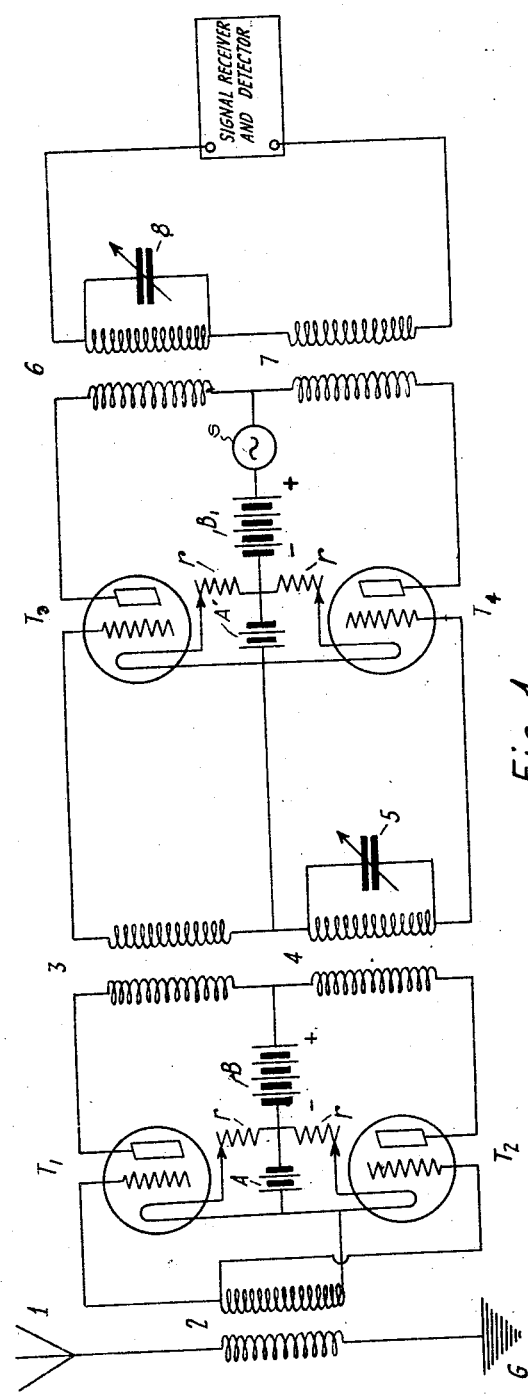
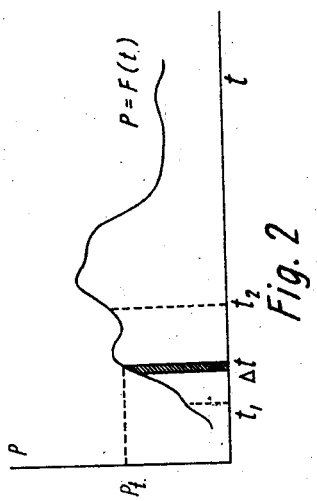
INVENTOR
HENRI J.J.M. de R de BELLESCIZE
BY
ATTORNEY Patented Oct. 9, 1928.

1,687,063

UNITED STATES PATENT OFFICE.

HENRI JEAN JOSEPH MARIE DE REGNAULD DE BELLESCIZE, OF PARIS, FRANCE.

ELECTRIC SIGNALING.

Application filed December 24, 1924, Serial No. 757,783, and in France December 28, 1923.

My invention relates to electric signaling and particularly to electric signaling systems and methods.

One of the principal objects of my invention is the provision of an electric signaling system for the reception of radio signals in which the ratio of signal strength to static strength is substantially increased.

Further objects and advantages of my invention will be apparent from the following description taken in conjunction with the accompanying drawings in which:—

Fig. 1 is a schematic diagram of a preferred modification of my invention.

Fig. 2 is an illustrated diagram of a static disturbance.

Referring to Fig. 1, the antenna circuit comprises an antenna 1 and a primary coil of a coupling device 2 connected in series and grounded at G as shown.

One of the terminals of the secondary coil of coupling device 2 is connected to both the grid elements of triodes $T_1$ and $T_2$ as shown. The other terminal of the secondary coil is connected to the filaments of triodes $T_1$ and $T_2$.

The plate filament circuit of the triode $T_1$ comprises a primary coil of coupling device 3 and a plate battery B connected in series as shown; the plate filament circuit of triode $T_2$ comprises the primary coil of coupling device 4 and the plate battery B connected in series as shown. The filaments of triodes $T_1$ and $T_2$ are energized by means of the common battery A, the currents in said filaments being independently controlled by means of variable rheostats $r$.

The secondary coil of coupling device 3 has one terminal connected to the grid element of triode $T_3$, and the other terminal of said secondary connected to the filament of said triode. The secondary coil of coupling device 4 has one terminal connected to the grid element of triode $T_4$, and the other terminal of said secondary connected to the filament of said triode, there being a common connection from said secondaries to the filaments of triodes $T_3$ and $T_4$. A variable condenser 5 is connected across the terminals of the secondary coil of coupling device 4.

The plate filament circuit of triode $T_3$ comprises the primary winding of coupling device 6, modulation generator S and plate battery B', all connected in series as shown.

The plate filament circuit of triode $T_4$ comprises the primary coil of coupling device 7, the modulation generator S and the plate battery B' all connected in series as shown. The filaments of triodes $T_3$ and $T_4$ are energized from the common battery A', the currents in the said filaments being independently controlled by means of adjustable rheostats $r$.

The secondary coils of coupling devices 6 and 7 are connected in series across the signal receiver and detector as shown.

The variable condenser 8 is connected across the terminals of the secondary coil of the coupling device 6.

The local circuit, comprising the secondary coil of coupling device 4 and condenser 5, is tuned to the signal frequency by means of the condenser 5; while the local circuit, comprising the secondary coil of coupling device 6 and variable condenser 8, is tuned preferably to the signal frequency plus the frequency of the modulating generator S by means of the variable condenser 8.

It is thought that the following theory furnishes the basis of operation of the above described system; however, it is to be distinctly understood that entire reliance is not to be placed on the following theory of operation as a basis for explaining the results achieved.

As soon as signal waves of frequency $f$ impinge on the antenna 1, these waves will be amplified by triodes $T_1$ and $T_2$ together with the aperiodic static pulse. The local circuit comprising the secondary coil of coupling device 4 and condenser 5 being tuned to the signal frequency $f$ will convert the amplified static pulse into a train of damped oscillations of frequency $f$. The static pulse amplified by triode $T_1$ will of course make its appearance in the secondary coil of coupling device 3 simply as an amplified single static pulse.

The signal waves of frequency $f$ and a single static pulse are impressed on the grid element of triode $T_3$, and the signal waves of frequency $f$ and a train of damped waves of frequency $f$ corresponding to the static are impressed on the grid element of triode $T_4$. The signal waves in the plate filament circuit of triode $T_3$ are combined with the waves of frequency $f'$ from the modulating generator S. This results in waves of frequency $f$, $f$ minus $f'$ and $f$ plus $f'$, together with the single static pulse in the plate filament circuit of triode $T_3$. Waves of frequency $f$, $f$ plus $f'$ and $f$ minus $f'$ exist in the plate filament circuit of triode $T_4$ due to the signal waves and corresponding waves due to the train of damped waves of frequency $f$ which was set up in the local circuit comprising the secondary coil of coupling device 4 and condenser 5. The signal receiver and detector are tuned to the waves of frequency $f$ plus $f'$; while the local circuit, comprising the secondary coil of coupling device 6 and variable condenser 8, is tuned to the frequency $f$ plus $f'$. This local circuit converts the single static pulse appearing in the plate filament circuit of triode $T_3$ into a train of damped oscillations having a frequency of $f$ plus $f'$. The waves of frequency $f$ neutralize each other in the couplings 6 and 7 while the waves of frequency $f$ minus $f'$ are substantially eliminated due to the tuning of the signal receiver and detector to the frequency $f$ plus $f'$. The signal waves of frequency $f$ plus $f'$ in the plate filament circuits of triodes $T_3$ and $T_4$ are in phase and are added by the connection of the secondary coils of coupling devices 6 and 7. However, the train of damped oscillations of frequency $f$ plus $f'$ due to the static pulse in the local circuit comprising the secondary coil of the coupling device 6 and condenser 8 is not in phase with the train of damped oscillations in the secondary coil of coupling device 7.

The added effect of these two trains of damped oscillations of frequency $f$ plus $f'$ due to the static disturbance is therefore not equal to twice the effect of one of the trains of damped oscillations; while the added effect of the two trains of signal waves of frequency $f$ plus $f'$ is twice that of one of the trains of signal waves of frequency $f$ plus $f'$.

It is therefore obvious that the effect of the signal is doubled while the effect of the static is not doubled, which results in a larger ratio of signal strength to static strength.

The plate current of a triode equals "$K u v$", where $v$ equals the grid potential, $u$ equals the plate potential and $K$ equals a constant.

Referring to Fig. 2 let P equal F (T), the form of the electromotive force as a function of the time produced by the static in the secondary coils of coupling devices 3 and 4. Also let $Pt$ be the instantaneous value of the said electromotive force during an interval of time, $\triangle T$ of infinitely short length and chosen at random.

If $E'$ equals the instantaneous electromotive force across the modulating generator S, $Em$ equals the maximum electromotive force across the modulating generator; $f'$ equals the frequency of said generator, $t$ any time during a cycle and O the phase of the electromotive force, then $E' = Em \sin(2\pi f't + O)$.

In the plate circuits comprising triodes $T_1$ and $T_3$ the instantaneous disturbance $Pt$ manifests itself by an alteration or change which is equal to $Pt$ U Sin O. This alteration and as a consequence the inductive action upon the tuned circuit comprising the secondary coil of coupling devices 4 and condenser 5 depend upon the angles O, in other words, upon the phase of the modulating oscillations at the instant under consideration $\triangle T$. According to the value of O, the disturbing effect of $Pt$ can be changed more or less and even be entirely eliminated. To obtain the distributing effect for the interval of time between the two limits $t_1$, $t_2$ it would be necessary to repeat step by step the operation for interval $\triangle T$ and it will be seen that the total result will depend upon the development or shape of the modulating oscillation with reference to the way the instantaneous amplitudes $P_2$ follow each other. The modulating action brought upon the aperiodic static current modifies the action thereof in an unknown manner, depending upon the shape of such disturbance and this is, of course, a matter of chance. It can also be said that the distribution of the static actions as functions of time is modified by the modulation.

In the circuits comprising triodes $T_2$ and $T_4$ the same static disturbance with instantaneous value $Pt$ produces first in the tuned circuit comprising secondary coil of coupling device 4 and condenser 5, a train of damped oscillations of frequency $f$ and amplitude X proportional to the hatched area in Fig. 2. The following is the equation of this train of oscillations:

$$X e^{-xt} \sin 2\pi ft.$$

The plate current of triode $T_4$ can be expressed by the following equations:

$$K. X e^{-xt} \sin 2\pi ft . \ U \sin (2\pi f't + O)$$

$$K. e^{-xt} \frac{XU}{2} [\cos(2\pi f - f't - O) - \cos(2\pi f f't + O]$$

Hence the static component gives rise in a coupling device 7 to two trains of waves of frequency $f - f'$ and $f + f'$ (only the second one of which is to be reserved by virtue of the tuning of the signal receiver and detector), the amplitudes of the said trains being as a matter of fact entirely independent of the instantaneous value $\triangle$ T under consideration. In other words, in the circuits comprising triodes $T_3$ and $T_4$ the relative actions of the disturbance and the signal as a function of time are not modified by the modulation.

In brief, the antenna works upon two shunts namely $T_1$—3—$T_3$—(6—8) and $T_2$—(4—5)—$T_4$—7 giving rise to two signals whose effects become added to one another producing a signal twice that which would be produced separately by each, and to two parasitic actions the time distribution of which are not necessarily the same, and the resultant of which, as a consequence, is not twice that of each of the component disturbances.

While I have shown and described a preferred modification of my invention, I do not limit myself to the same but may employ such other embodiments as come within the spirit and scope of my invention.

I claim the following:—

1. In combination, an antenna circuit responsive to signal waves of frequency $f$ and static pulses, a first series of circuits for amplifying the signal waves and the static pulses and for modulating the signal waves and then converting the static pulses into a train of damped oscillations of the signal frequency plus or minus the modulating frequency, a second series of circuits parallel to said first series for amplifying the signal waves and the static pulses and converting the static pulses into a train of oscillations of the signal frequency and then amplifying and modulating both the signal waves and the train of oscillations corresponding to the static pulses, and a signal receiver and detector responsive to both said first and second series of circuits, whereby the ratio of signal effect to static effect is substantially increased.

2. The method of increasing the ratio of signal effect to static effect comprising, first, the amplification of the signal waves and the static pulse, simultaneously with a second amplification of the signal waves and static pulse and the conversion of the static pulse into a train of oscillations of signal frequency, secondly, the amplification and modulation of the signal waves, simultaneously with a second amplification and modulation of both the signal waves and the train of oscillations corresponding to the static pulse, thirdly, the conversion of the static pulse into a train of oscillations having a frequency equal to the frequency of the signal waves plus or minus the frequency of modulation, and then combining all of said waves together whereby the effects of the impulse equal to the frequency of the signal waves and the frequency of the modulated waves are doubled and the effects of the oscillations due to the static are not doubled, resulting in a substantial increase of the ratio of signal effect to static effect.

3. A signal receiving system for reducing the ratio of static impulse to signal impulse comprising an antenna circuit, a pair of triodes connected in parallel and having a common input coil coupled to said antenna circuit, an amplifier system comprising two triodes having their input circuits coupled to the output circuits of said first mentioned triodes respectively, means in one input circuit of said amplifier to convert a static impulse into a wave train of oscillations having the signal frequency, means to add a modulating frequency to the signal frequency, means to balance out the signal frequency and to add the modulated frequencies, and means to detect said added frequencies.

4. In a radio receiving system, the combination of an antenna, a pair of triodes connected in parallel and coupled to said antenna, an amplifier coupled to each output circuit of said triodes, one only of said amplifiers having its input circuit tuned to the signal frequency, a modulating generator connected in the output circuit of each amplifier, a detector circuit tuned to the sum of the modulating frequency and the signal frequency, and a circuit interposed between the detector circuit and the output circuits of said amplifiers.

5. In a radio receiving system, the combination of an antenna, a pair of triodes connected in parallel and coupled to said antenna, a first transformer-coupled amplifier associated with the output of one of said triodes, the input of said amplifier being aperiodic, a second transformer-coupled amplifier associated with the output of the other of said triodes, the input of said amplifier being tuned to the signal frequency, means for modulating the outputs of said amplifiers, a detector circuit, and a transformer-coupled circuit interposed between the detector circuit and the output circuits of the amplifiers, said circuit having a secondary tuned to the sum of the modulating frequency and signal frequency coupled to the first amplifier and another untuned secondary coupled to the second amplifier and connected in series with the tuned secondary.

6. The method of increasing the ratio of signal strength to static strength, which consists in simultaneously feeding the received signal and static pulse thru two parallel branched circuits, in one of said circuits amplifying both signal and static pulse, modulating the signal, and then converting the static pulse into a freely damped wave of a selected modulation beat frequency, in the other of said circuits amplifying the signal, converting the static pulse to a freely damped wave of the same frequency as the signal, and then modulating the signal and static waves, adding the energies of the selected modulation beat frequency from each of said branched circuits, and detecting the resultant.

HENRI JEAN JOSEPH MARIE de
REGNAULD de BELLESCIZE.